United States Patent

[11] 3,601,621

[72] Inventor Edwin E. Ritchie
Rte 6, Box 6147, Bainbridge Island, Wash. 98110

[21] Appl. No. 850,967
[22] Filed Aug. 18, 1969
[45] Patented Aug. 24, 1971

[54] PROXIMITY CONTROL APPARATUS
6 Claims, 6 Drawing Figs.

[52] U.S. Cl. .......... 307/116, 331/65
[51] Int. Cl. .......... H01h 35/00
[50] Field of Search .......... 141/156–162; 307/116, 117, 118, 119; 331/65, 66

[56] References Cited

UNITED STATES PATENTS

| | | | |
|---|---|---|---|
| 3,388,566 | 6/1968 | Kaper et al. .......... | 307/117 X |
| 3,469,204 | 9/1969 | Magyar et al. .......... | 307/116 X |
| 3,510,677 | 5/1970 | Lister .......... | 307/116 |
| 3,512,000 | 5/1970 | Powell .......... | 307/117 X |
| 3,514,627 | 5/1970 | Bridgeman .......... | 307/116 |

*Primary Examiner*—Robert K. Schaefer
*Assistant Examiner*—H. J. Hohauser
*Attorney*—Allen and Chromy

ABSTRACT: An electronic control responsive to the presence of an object in predetermined proximity to the probe thereof. The probe is connected to an oscillation generator which supplies electrical oscillations to a circuit which controls the initiation of the timing cycle of a timing device when an object is brought into proximity of the probe and electrical oscillations supplied by the generator are interrupted. The timing device supplies a signal to a control circuit after a predetermined timed interval to shut off the load circuit which was activated when the timing cycle was started.

INVENTOR.
EDWIN E. RITCHIE

BY

Allen and Chromy
ATTORNEYS

INVENTOR.
EDWIN E. RITCHIE

BY Allen and Chromy

ATTORNEYS

INVENTOR.
EDWIN E. RITCHIE

BY

Allen and Chromy

ATTORNEYS

PROXIMITY CONTROL APPARATUS

DESCRIPTION OF THE INVENTION

This invention relates to an electronic control that is responsive to the presence of an object in predetermined proximity thereto.

An object of this invention is to provide an improved electronic control which initiates a timing cycle when an object is brought into the proximity of the probe thereof and which stops the timing cycle after a predetermined timed interval even though the object is not removed from the proximity the probe.

Another object of this invention is to provide an improved electronic control which may be used to dispense or control the dispensing of various amounts or quantities of liquids or solids and which is provided with an adjustable control so that a desired quantity dispensed may be controlled or varied.

Another object of this invention is to provide an improved electronic control employing an oscillation generator equipped with a sensor such that when an object is brought into the proximity of the sensor, generation of oscillations is interrupted and a timing device and a load circuit are activated, said timing device being provided with a control which deactivates the load circuit after the predetermined timed interval to which the timing device is adjusted.

Other and further objects of this invention will be apparent to those skilled in the art to which it relates from the following specification, claims and drawings.

In accordance with this invention there is provided an improved electronic control of the type which is responsive to the presence of an object in predetermined proximity thereto. This invention is similar to that disclosed in my prior U.S. Pat. No. 3,033,248 and includes improvements and features not disclosed in this prior patent.

The present invention employs a Hartley-type oscillation generator which is provided with a field effect transistor having high impedance characteristics. This transistor amplifier is connected with a feedback circuit so that high frequency oscillations are generated thereby. The circuit is adjusted so that it is just barely above the point of sustained oscillation. Thus, very tiny amounts of absorbed energy from the sensor or probe can actively block oscillation of the circuit. A pickup coil is inductively coupled to the oscillator tank circuit and when the tank circuit is in oscillation a radio frequency voltage is induced into this coil and rectified by a suitable diode which supplies a voltage of positive polarity to the gate of a silicon controlled rectifier that is connected across a full-wave rectifier which supplies DC to a timing device or circuit only when the silicon controlled rectifier is in nonconducting condition. Thus, when the oscillation generator goes off, that is when an object approaches or is placed in proximity of the probe or sensor, the full-wave rectifier supplies a DC voltage to the timing device and also to the gate of another silicon controlled rectifier which is connected in series with the load controlling device which may be a switching device such as a relay or a solenoid for controlling a heating circuit or valve. After a predetermined time interval to which the timing device is adjusted a signal is supplied to turn this silicon controlled rectifier off and interrupt the load circuit.

Other features and details of this invention will be set forth in the following specification, claims and drawing, in which:

Figures 1, 6:
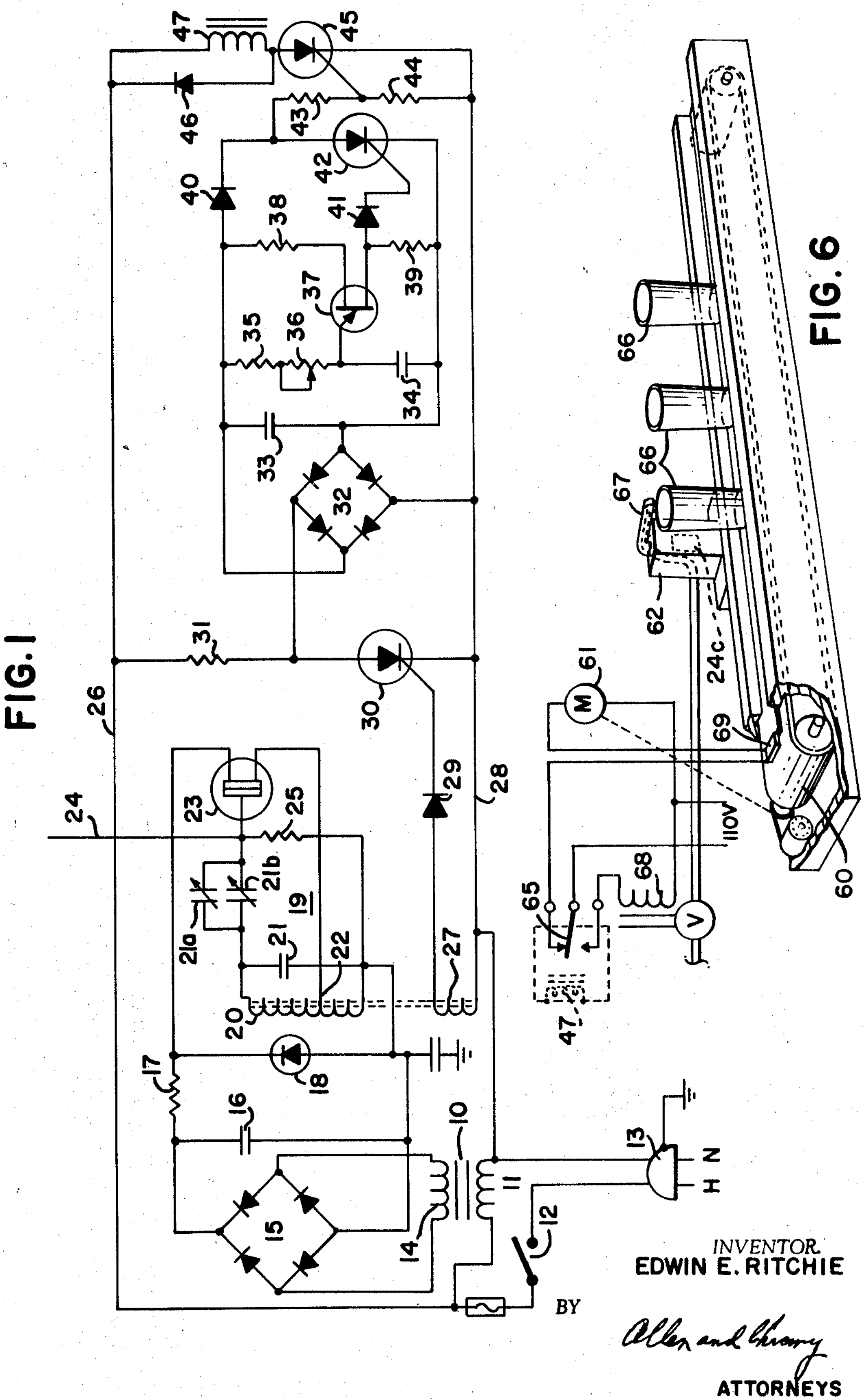
FIG. 1 is a schematic wiring diagram of the electrical circuit employed in this invention.
FIG. 6 is a view of a motor driven conveyor and liquid dispensing station associated therewith which are provided with an electronic control in accordance with this invention to dispense liquids to containers on the conveyor.

Referring to the drawing in detail, reference numeral 10 designates a transformer having a primary winding 11 which is adapted to be connected to the conventional wall plug 13 of a suitable current supply through a manually controlled switch 12 of conventional construction. The transformer 10 is also provided with a low voltage secondary 14 which is connected across the full-wave rectifier 15. Filter capacitor 16 is connected across the output of the rectifier 15 and current limiting resistor 17 is connected in series with the output. A zener diode 18 is provided across the DC output and functions to hold this output to a constant voltage.

The Hartley-type oscillation generator 19 is provided with a tank inductance coil 20. The capacitor 21 is connected across this coil and the tap 22 thereof is connected to the drain electrode of the transistor 23 which is of the field effect type. Variable capacitors **21*a* and 21*b* are connected in parallel with one side thereof connected to the control electrode of the field effect transistor. These capacitors may be considered as a single admittance capacitor whose sole function is to admit and also limit electrical oscillations fed to the input of the field effect transistor 23** from the tank circuit. One of these capacitors may be adjusted by a plastic extension provided thereto for setting the value of this capacitor and adjusting the oscillation generating circuit so that it is just barely above the point of sustained oscillation.

The probe 24 is connected to the base electrode of transistor 23 and a resistor 25 of relatively high value is connected between this electrode and the bottom terminal of the tank circuit including the inductance 20 and capacitor 21.

A pickup coil 27 is coupled to the tank coil 20. One side of this pickup coil is connected to the ground line 28 while the other side is connected to the diode 29 and to the gate of the silicon controlled rectifier 30. The silicon controlled rectifier 30 and resistor 31 are connected in series between the lines 26 and 28 which are connected to the wall plug 13. Thus, these lines supply the conventional 115-volt AC supply across rectifier 30 and resistor 31. The common connection between rectifier 30 and resistor 31 is connected to one side of the input of full-wave rectifier 32 and the other side of the input of this rectifier is connected to the ground line 28. Thus, the silicon controlled rectifier 30 is connected across the input of the full-wave rectifier 32 and when this rectifier is in conductive condition it functions to shunt or bypass the input of the full-wave rectifier 32.

The output of rectifier 32 is connected across the filter capacitor 33 and also across the R-C circuit which includes the capacitor 34 and resistors 35 and 36 which are part of the timing circuit. Resistor 36 made variable so that the timing interval may be adjusted as desired. The common connection between resistor 36 and capacitor 34 is connected to the emitter electrode of the unijunction transistor 37. The base electrodes of transistor 37 are connected to the resistors 38 and 39, respectively, and through these resistors across the output of the full-wave rectifier 32.

Thus, when the capacitor 34 of the timing circuit is charged to a predetermined voltage such as to fire the transistor 37 this capacitor is discharged through this transistor and through resistor 39. At the same time an electric pulse is supplied to the anode of diode 41 and through this diode to the gate of silicon controlled rectifier 42. Diode 40 and silicon controlled rectifier 42 are connected in series across the output of full-wave rectifier 32, and the common connection between diode 40 and rectifier 42 is connected to the gate of silicon controlled rectifier 45 through resistor 43. Resistors 43 and 44 are connected in series and the common connection between these resistors is connected to the gate of silicon controlled rectifier 45. Rectifier 45 is connected in series with the solenoid 47 and these two devices are connected in series across the AC supply line 26 and 28. Thus, when the gate of silicon controlled rectifier 45 is fired by current flowing through diode 40 and rectifiur 42 rectifier 45 supplies rectified AC to the solenoid 47. A diode 46 is shunted around the winding solenoid 47 to bypass induced voltages such as may be induced therein by its collapsing magnetic field. Solenoid 47 may be the winding of a relay or it may be the winding of a solenoid valve.

Silicon controlled rectifier 42 is turned on by a very short pulse supplied to the gate electrode thereof by the unijunction transistor 37 through the diode 41. Silicon control rectifier 42 is latched in its "on" condition as long as direct current is supplied thereto from the rectifier 32. The direct current supplied to the rectifier 42 from full-wave rectifier 32 is interrupted when the object is removed from the proximity of the probe or sensor 24 so that the oscillation generator resumes the production of high frequency oscillations which are supplied to the pickup coil 27 and rectified by the diode 29 to be impressed upon the gate electrode of silicon controlled rectifier 30.

When rectifier 30 is activated, it acts as a shunt across the input of the full-wave rectifier 32 and the supply of DC on the output of this rectifier 32 is interrupted so that the flow of current through silicon controlled rectifier 42 is also interrupted. Rectifier 42 then becomes a high impedance shunt around resistors 43 and 44 and one of diodes of full-wave rectifier 32. Consequently, when the next object is brought in proximity of the probe or sensor 24 and the generation of oscillations by the generator 19 is interrupted, the impedance of rectifier 30 is increased and current then flows from between lines 26 and 28 through resistor 31 and the input of the full-wave rectifier 32. The DC output of rectifier 32 is then supplied to the timing circuit including the capacitor 34 and resistors 35 and 36. At the same time, the DC from the output of rectifier 32 is supplied through diode 40 and resistor 43 to the gate of silicon controlled rectifier 45. Current then flows through the solenoid 47 and rectifier 45 from the AC lines 26 and 28, Solenoid 47 is then energized at the beginning of the timing cycle, the length of which is determined by the R-C circuit including the capacitor 34 and the resistors 35 and 36.

When the capacitor 34 is charged, transistor 37 is turned on and a pulse is supplied from this transistor through diode 41 to the gate of silicon controlled rectifier 42. When rectifier 42 becomes conducting, it shunts resistors 43 and 44 through one of the diodes of full-wave rectifier 32 and thus is instrumental in turning silicon controlled rectifier 45 off at the end of the timing cycle. Thus solenoid 47 is turned off at the end of the timing cycle even though the object which is placed in proximity of the probe or sensor 24 is not removed therefrom On the other hand, if the object placed in the proximity of the probe or sensor 24 is removed before the timing cycle is completed, generator 19 resumes the generation of electrical oscillations and rectifier 30 is turned on so that the full-wave rectifier 32 is deactivated. Thus the DC to the gate of silicon controlled rectifier 45 is interrupted and solenoid 47 is turned off before the end of the timing cycle.

Figure 2:
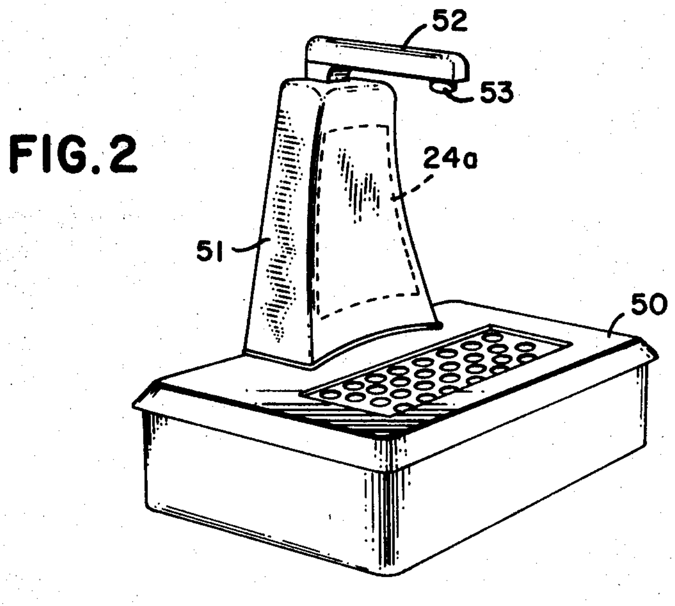
FIG. 2 is a perspective view of a liquid dispensing station which is adapted to be controlled in accordance with this invention.
Figure 3:
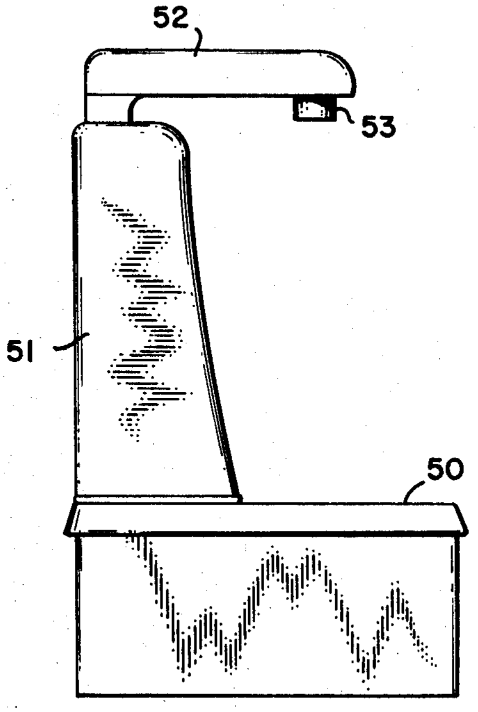
FIG. 3 is a side view of the liquid dispensing station shown in FIG. 2.

In FIGS. 2 and 3 there is shown a liquid dispensing station which is adapted to be controlled by the circuit shown in FIG. 1. This device is provided with a base 50 which is adapted to be made of material such as stainless steel, plastic or the like and which is adapted to house the electronic circuit parts shown in FIG. 1. This device is also provided with a post 51 made of plastic or the like supported on the base 50. The front of the post 51 is provided with a metal sheet *24a* that is positioned inside thereof against the back of the plastic front and this metal sheet functions as the probe 24 shown in FIG. 1. The top of the post 51 is provided with an overhanging member 50 which encloses a pipe that is connected to the spigot 53. The pipe inside of the member 52 extends down through the post 51 and is connected to a solenoid controlled valve which is adapted to be controlled by the solenoid 47 shown in FIG. 1. Thus when an object such as a glass receptacle is placed on the base 50 under the spigot 53 and in front of the sensor plate *24a*, the circuit shown in FIG. 1 functions to turn the liquid supply valve on so that liquid flows out of the spigot 53 into the container.

The timing circuit including the capacitor 34 and resistors 35 and 36 is adjusted so that the time during which the valve is open is such that the glass will be filled a predetermined amount before the solenoid valve is turned off. On the other hand, if the operator of this device desires only a smaller amount of liquid in the receptacle, then he may stop the flow of liquid simply by removing the glass or receptacle and the circuit will turn the solenoid valve off as previously described.

Figure 4:
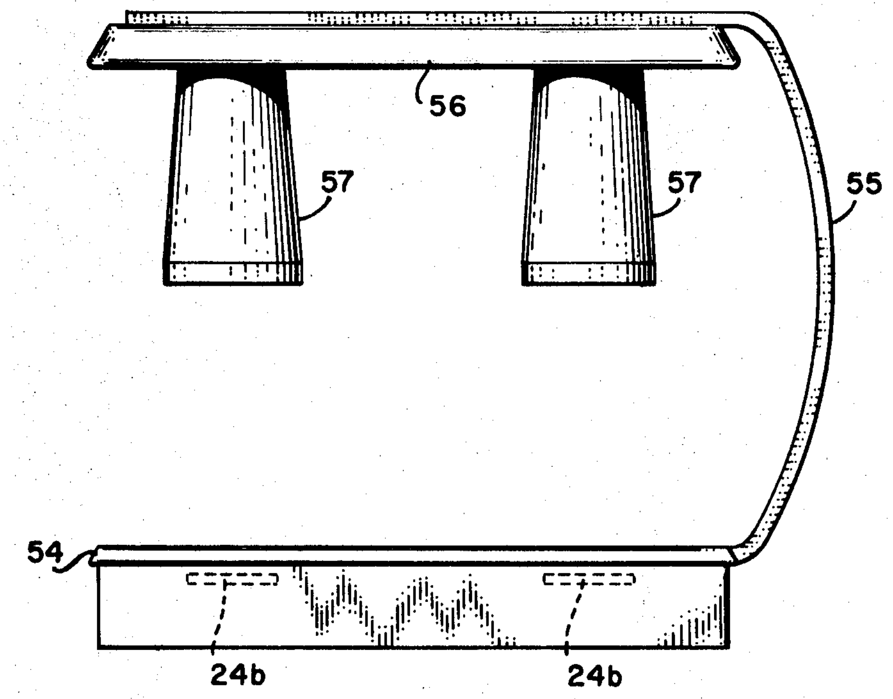
FIG. 4 is a side view of a food heating or warming station which is adapted to be controlled in accordance with this invention.
Figure 5:
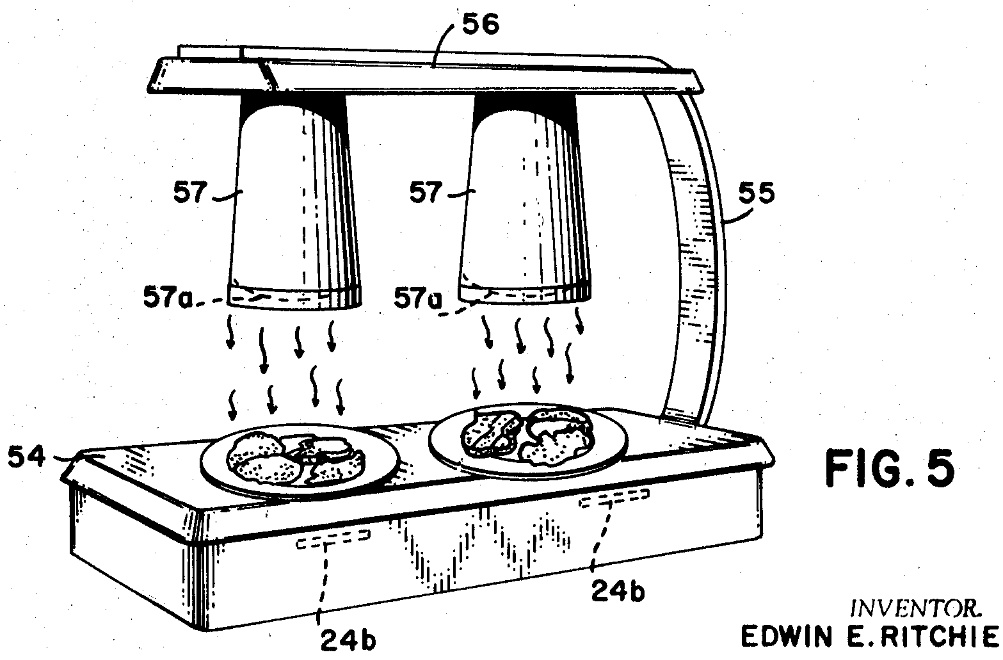
FIG. 5 is a perspective view of the food heating or warming station shown in FIG. 4.

In FIGS. 4 and 5 there are shown views of a heat station that is adapted to be controlled by tee electronic circuit shown in FIG. 1. This device is provided with a base structure 54 which is adapted to be made of material such as glass or plastic and which is provided with sensors or probes *24b* that are positioned under the top of the base structure 54. This structure is hollow and space is provided therein for housing the electronic circuit. A post 55 is attached to one end of the base structure and supports the overhanging member 56 to which the reflectors 57 are attached. Suitable radiant heating elements such as lamps, are positioned inside of the reflectors 57 so that the heat from these heat sources is directed downward toward the top of the base structure 54. When a plate carrying food is placed on the top of the base structure 54 over one of the sensors 24b, the electronic circuit functions to turn the heat lamp directly over the plate on so that heat is supplied to the food on the plate. The electric current to the heat lamps is controlled by a relay and in this case the relay winding corresponds to the winding 47 shown in FIG. 1. Thus when the winding 47 is energized, it functions to close the relay contacts associated therewith and electric current is supplied through the closed circuit to the heat lamp.

Since it may be desirable to furnish heat to warm the plates on the top of the base structure 54, for various indeterminant time intervals the electronic circuit controlling the current to the heat lamps need not be provided with the timing device shown in FIG. 1. As a result, the full-wave rectifier 32 and the timing element including the capacitor 34 and resistors 35 and 36, transistor 37, diode 41 and silicon controlled rectifier 42 may be dispensed with. In this case, the anode of diode 40 may be connected directly to the anode of silicon controlled rectifier 30 and the bottom terminal of resistor 44 may be connected to the line 28. The circuit thus modified will then function to control the supply of heat to the plates positioned on the top of the base structure 54 as long as the plates are so positioned. The heat lamps will in this case be turned off when the plates are removed from the top of the base structure 54.

In FIG. 6 there is shown an embodiment of this invention in which the electronic circuit shown in FIG. 1 is employed to control the conveyor motor 61 and the liquid dispensing station 62. The winding 47 in this case controls a relay having normally closed contacts and normally open contacts. The relay is provided with an armature 65 which engages the contact 63 to form the normally closed contacts through which electric current is supplied to the motor 61 from the conventional 115-volt AC supply. The motor 61 is arranged to drive the conveyor 60 on which spaced receptacles such as glass containers 66 are positioned. Thus the motor 61 drives the conveyor 60 and when one of the containers 66 approaches the sensor or probe *24c* of the liquid dispensing station 62, the electronic circuit shown in FIG. 1 functions as previously described to energize the winding 47. The magnetic field set up by this winding moves the relay armature 65 down to contact 64 and away from the normally closed contact 63 so that the electric current supplied to the motor 61 is interrupted. At the same time, the solenoid 68 which controls the liquid supply valve is energized and the valve is opened so that the fluid flows through the pipeline connected to the spigot 67 and into the receptacle 66 positioned under this spigot. After a time interval determined by the timing device of FIG. 1, the solenoid 47 is deenergized. The current to valve solenoid 68 is then interrupted and the motor 61 is turned on since the armature 65 of the relay is released and moves into contact with the relay contact 63 away from contact 64. Motor 61 is then turned on and actuates the conveyor 60 to bring the next receptacle or container 66 into alignment with the spigot 67. It will be noted that in this instance the probe or sensor plate 24*c* is positioned slightly out of alignment with the spigot 67 in the direction of travel of the conveyor 60. The purpose of this is to allow the conveyor 60. The purpose of this is to allow the conveyor 60 to move the container 66 directly under the spigot 67 before stopping. A limit switch 69 is connected in series with the motor 61 and this limit switch is positioned near the end of the conveyor. This limit switch is normally closed and it is adapted to be open when a filled container 66 comes in contact therewith so that the motor 61 is stopped at this time to prevent moving the filled container 66 off of the conveyor and accidentally spilling the contents thereof.

The oscillation generator 19 may be adjusted to produce electric oscillations of various frequencies simply by varying the inductance and capacity of the tank circuit. In the construction and operation of this invention I have found frequencies around 400 kiloHertz to be very satisfactory both from the standpoint of stability of circuit operation and sensitivity of the probe field. Other higher or lower frequencies may, of course, be used if desired.

While I have shown and described certain preferred embodiment of the invention, it is apparent that the invention is capable of variation and modification from the form shown so that the scope thereof should be limited only by the proper scope of the claims appended hereto.

1. In an electronic control responsive to the presence of an object in predetermined proximity, the combination of an oscillation generator, a probe connected to said oscillation generator to interrupt the generation of oscillations when an object is placed in proximity thereto, a control circuit for controlling a work circuit, means responsive to the interruption of said oscillation generator activating said control circuit, said last mentioned means includes a first rectifier having a gate electrode which is connected to be fired when said oscillation generator is producing oscillations, said control circuit including a second rectifier having a gate which is connected to be fired when said first rectifier is turned off by the interruption of said oscillation generator, said second rectifier being turned off when said object is removed from the proximity of said probe.

2. In an electronic control responsive to the presence of an object in predetermined proximity, the combination of an oscillation generator, a probe connected to said oscillation generator to control the generation of oscillations when an object is placed in proximity to said probe, a timing device measuring a predetermined time interval, means responsive to said oscillation generator for controlling the operation of said timing device to initiate its cycle of operation, means controlling a work circuit, means actuating said last mentioned means for said predetermined time interval in response to the operation of said timing device, said means controlling a work circuit including a rectifier having a gate and means activating said gate at the beginning of said time interval and means controlled by said timing device for deactivating said gate to turn said rectifier and said work circuit off.

3. In an electronic control responsive to the presence of an object in predetermined proximity, the combination as set forth in claim 2 further characterized in that said means activating said gate comprises means producing a direct current controlled by said means responsive to said oscillation generator.

4. In an electronic control responsive to the presence of an object in predetermined proximity, the combination of an oscillation generator, a probe connected to said oscillation generator to interrupt the generation of oscillation when an object is placed in proximity thereto, a control circuit for controlling a work circuit, said control circuit including a rectifier connected to said work circuit, said rectifier having a gate, means responsive to the interruption of said oscillation generator activating said gate of said rectifier, and means deactivating said gate when said object is moved from the proximity of said probe.

5. In an electronic control responsive to the presence of an object in predetermined proximity, the combination as set forth in claim 4 further characterized in that said control circuit includes another rectifier having a gate which is connected to be fired when said oscillation generator is producing oscillations, said responsive means being connected to said other rectifier to supply an activating potential to said gate of said first mentioned rectifier when said oscillation generator is interrupted and said other rectifier is deactivated.

6. In an electronic control responsive to the presence of an object in predetermined proximity, the combination as set forth in claim 5 further characterized in that said control circuit includes a third rectifier connected to control the gate of said first mentioned rectifier, said third rectifier having a gate and timing means activating said gate of said third rectifier after a predetermined time interval so that said third rectifier deactivates said first mentioned rectifier.